US011196769B2

(12) United States Patent
Chakraborty et al.

(10) Patent No.: US 11,196,769 B2
(45) Date of Patent: Dec. 7, 2021

(54) EFFICIENT BOOTSTRAPPING OF TRANSMITTER AUTHENTICATION AND USE THEREOF

(71) Applicant: International Business Machines Corporation, Armonk, NY (US)

(72) Inventors: Supriyo Chakraborty, White Plains, NY (US); Bodhisatwa Sadhu, Fishkill, NY (US); Bong Jun Ko, Harrington Park, NJ (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 16/238,134

(22) Filed: Jan. 2, 2019

(65) Prior Publication Data

US 2020/0213354 A1 Jul. 2, 2020

(51) Int. Cl.
*H04L 29/06* (2006.01)
*G06N 20/00* (2019.01)
*G06F 9/4401* (2018.01)

(52) U.S. Cl.
CPC ........ *H04L 63/1483* (2013.01); *G06F 9/4416* (2013.01); *G06N 20/00* (2019.01); *H04L 63/0876* (2013.01)

(58) Field of Classification Search
CPC . H04L 63/1483; H04L 63/0876; G06N 20/00; G06F 9/4416
See application file for complete search history.

(56) References Cited

U.S. PATENT DOCUMENTS

| 10,007,866 B2 | 6/2018 | Criminisi |
| 2017/0365038 A1 | 12/2017 | Denton et al. |
| 2018/0075581 A1 | 3/2018 | Shi |
| 2018/0336471 A1 | 11/2018 | Rezagholizadeh |
| 2019/0080205 A1 | 3/2019 | Kaufhold |

(Continued)

OTHER PUBLICATIONS

Tim Salimans, et al., "Improved Techniques for Training GANs", 30th Conference on Neural Information Processing Systems (NIPS 2016), Barcelona, Spain.

(Continued)

*Primary Examiner* — Shin-Hon (Eric) Chen
*Assistant Examiner* — Jessica J South
(74) *Attorney, Agent, or Firm* — Harrington & Smith

(57) ABSTRACT

A GAN includes a first device and a second device. A discriminator model in the first device is trained to discriminate samples from a transmitter in the first device from samples from other transmitters, by collaborating by the first device with the second device to train the discriminator model to discriminate between samples from its transmitter and spoofed samples received from a generator model in the second device and to train the generator model in the second device to produce more accurate spoofed samples received by the first device during the training. The training results in a trained discriminator model, which is distributed to another device for use by the other device to discriminate samples received by the other device in order to perform authentication of the transmitter in the first device. The other device performs authentication of the transmitter of the first device using the distributed model.

19 Claims, 10 Drawing Sheets

(56) References Cited

U.S. PATENT DOCUMENTS

| | | | | |
|---|---|---|---|---|
| 2019/0149519 A1* | 5/2019 | Bajekal | ................... | H04W 4/80 726/4 |
| 2019/0251167 A1 | 8/2019 | Krishnapura | | |
| 2019/0325264 A1* | 10/2019 | Keserich | ................... | G06K 9/66 |
| 2019/0354629 A1 | 11/2019 | Zavesky | | |
| 2019/0392304 A1 | 12/2019 | Aliper | | |
| 2020/0042801 A1 | 2/2020 | Auner | | |
| 2020/0110341 A1* | 4/2020 | Mossavat | ................ | G03F 7/705 |
| 2021/0049464 A1* | 2/2021 | Xu | ....................... | G06N 3/0472 |

OTHER PUBLICATIONS

Skymind, Artificial Intelligence Wiki, "A Beginner's Guide to Generative Adversarial Networks (GANs)", no date associated, but downloaded on Nov. 27, 2018 from https://skymind.ai/wiki/generative-adversarial-network-gan.

J.-. Plouchart et al., "Adaptive Circuit Design Methodology and Test Applied to Millimeter-Wave Circuits," in IEEE Design & Test, vol. 31, No. 6, pp. 8-18, Dec. 2014.

Bousmalis et al. "Unsupervised Pixel-Level Domain Adaptation with Generative Adversarial Networks" downloaded on Aug. 23, 2018.

Zhu, Chenxiao, et al. "Tensor-Generative Adversarial Network with Two-dimensional Sparse Coding: Application to Real-time Indoor Localization." arXiv preprint arXiv:1711.02666 (Nov. 2017). https://arxiv.org/pdf/1711.02666.pdf.

Nguyen, N.T., Zheng, G., Han, Z. and Zheng, R., Apr. 2011, Device fingerprinting to enhance wireless security using nonparametric Bayesian method. In INFOCOM, 2011 Proceedings IEEE (pp. 1404-1412). IEEE.

Brik, V., Banerjee, S., Gruteser, M. and Oh, S., 2008. Wireless Device Identification with Radiometric Signatures. MobiCom'08, Sep. 14-19, 2008, San Francisco, California, USA.

Scanlon, P., Kennedy, I.O. and Liu, Y., 2010. Feature extraction approaches to RF fingerprinting for device identification in femtocells. Bell Labs Technical Journal, 15(3), pp. 141-151. [retrieved Aug. 2018].

* cited by examiner

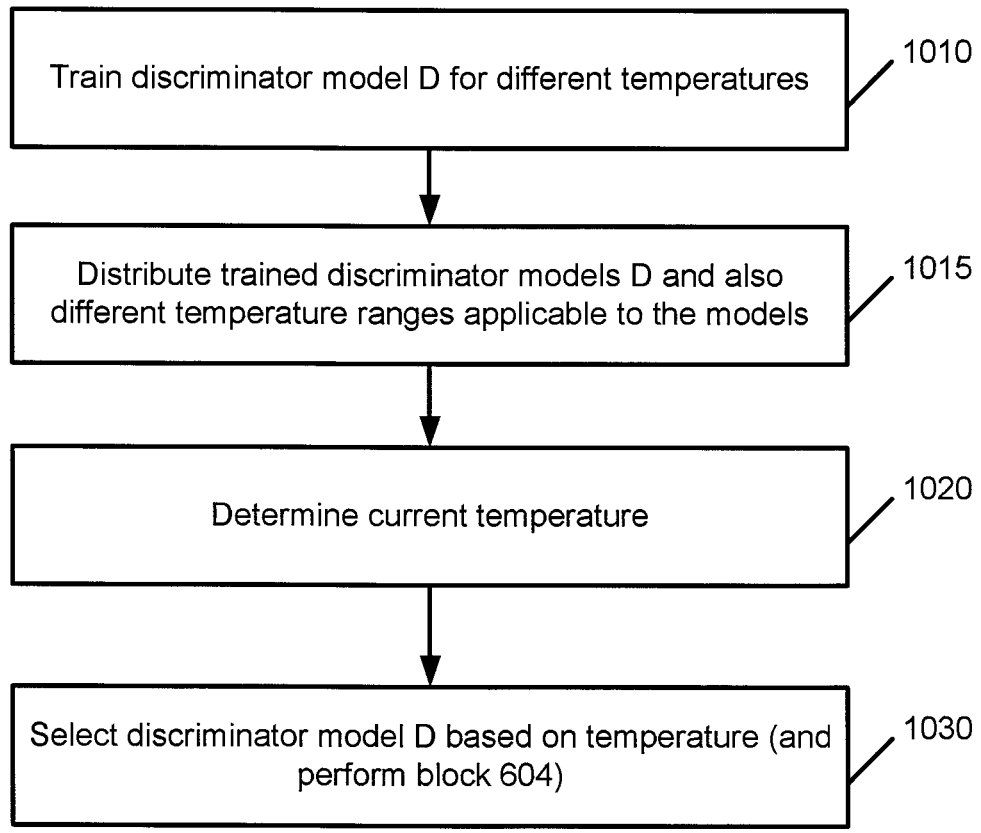

EFFICIENT BOOTSTRAPPING OF TRANSMITTER AUTHENTICATION AND USE THEREOF

BACKGROUND

Various example embodiments generally relate to communication systems, and more specifically relate to authentication of transmitters in communication systems.

In a typical communication system, a transmitter imparts a unique hardware-specific signature into a message signal before the transmitter transmits the signal over a wireless channel. The signature comprises hardware specific non-linear transformations of the signal and can potentially be used to authenticate the transmitter. After being transmitted, the signal undergoes linear transformation via additive noise effects introduced by the channel. When the signal is received at a receiver, the incoming waveform undergoes further non-linear transformations due to the receiver hardware before being decoded to the original message.

SUMMARY

This section is meant to be exemplary and not meant to be limiting.

In an exemplary embodiment, a method includes training, using a generative adversarial network comprising a first device and a second device, a discriminator model in the first device to discriminate samples from a transmitter in the first device from samples from other transmitters. The training is performed at least by collaborating by the first device with the second device to train the discriminator model to discriminate between samples from its transmitter and spoofed samples received from a generator model in the second device and to train the generator model in the second device to produce more accurate spoofed samples received by the first device during the training. The training results in a trained discriminator model. The method includes distributing the trained discriminator model to another device for use by the other device to discriminate samples received by the other device in order to perform authentication of the transmitter in the first device.

An exemplary apparatus includes one or more processors and one or more memories including computer program code. The one or more processors, ins response to retrieval and execution of the computer program code, cause the apparatus to perform at least the following: training, using a generative adversarial network comprising a first device and a second device, a discriminator model in the first device to discriminate samples from a transmitter in the first device from samples from other transmitters, the training performed at least by collaborating by the first device with the second device to train the discriminator model to discriminate between samples from its transmitter and spoofed samples received from a generator model in the second device and to train the generator model in the second device to produce more accurate spoofed samples received by the first device during the training, wherein the training results in a trained discriminator model; and distributing the trained discriminator model to another device for use by the other device to discriminate samples received by the other device in order to perform authentication of the transmitter in the first device.

Another exemplary embodiment is a computer program product comprising a computer readable storage medium having program instructions embodied therewith. The program instructions are executable by a device to cause the device to perform operations comprising: training, using a generative adversarial network comprising a first device and a second device, a discriminator model in the first device to discriminate samples from a transmitter in the first device from samples from other transmitters, the training performed at least by collaborating by the first device with the second device to train the discriminator model to discriminate between samples from its transmitter and spoofed samples received from a generator model in the second device and to train the generator model in the second device to produce more accurate spoofed samples received by the first device during the training, wherein the training results in a trained discriminator model; and distributing the trained discriminator model to another device for use by the other device to discriminate samples received by the other device in order to perform authentication of the transmitter in the first device.

A further exemplary embodiment is a method comprising training, using a generative adversarial network comprising a first device and a second device, a generator model in the second device. The training is performed at least by collaborating by the second device with the first device to train the generator model in the second device to produce more accurate spoofed samples transmitted by the second device and toward the first device during the training, and to train a discriminator model in the first device to discriminate between samples from its transmitter and spoofed samples received from the generator model during the training. The method includes receiving at the second device a trained discriminator model from the first device for use by the second device to discriminate signals from transmitters in order to perform authentication of the transmitter in the first device.

An exemplary apparatus includes one or more processors and one or more memories including computer program code. The one or more processors, ins response to retrieval and execution of the computer program code, cause the apparatus to perform at least the following: training, using a generative adversarial network comprising a first device and a second device, a generator model in the second device, the training performed at least by collaborating by the second device with the first device to train the generator model in the second device to produce more accurate spoofed samples transmitted by the second device and toward the first device during the training, and to train a discriminator model in the first device to discriminate between samples from its transmitter and spoofed samples received from the generator model during the training; and receiving at the second device a trained discriminator model from the first device for use by the second device to discriminate signals from transmitters in order to perform authentication of the transmitter in the first device.

Another exemplary embodiment is a computer program product comprising a computer readable storage medium having program instructions embodied therewith. The program instructions are executable by a device to cause the device to perform operations comprising: training, using a generative adversarial network comprising a first device and a second device, a generator model in the second device, the training performed at least by collaborating by the second device with the first device to train the generator model in the second device to produce more accurate spoofed samples transmitted by the second device and toward the first device during the training, and to train a discriminator model in the first device to discriminate between samples from its transmitter and spoofed samples received from the generator model during the training; and receiving at the second device a trained discriminator model from the first device for use by the second device to discriminate signals from transmitters in order to perform authentication of the transmitter in the first device.

An additional exemplary embodiment is a method comprising receiving at a device and from a first device a trained discriminator model that has been trained to discriminate between samples from a transmitter of the first device and other transmitters. The method also comprises discriminating between samples received at the device using the trained discriminator model in order to perform authentication of the transmitter of the first device.

An exemplary apparatus includes one or more processors and one or more memories including computer program code. The one or more processors, ins response to retrieval and execution of the computer program code, cause the apparatus to perform at least the following: receiving at a device and from a first device a trained discriminator model that has been trained to discriminate between samples from a transmitter of the first device and other transmitters; and discriminating between samples received at the device using the trained discriminator model in order to perform authentication of the transmitter of the first device.

Another exemplary embodiment is a computer program product comprising a computer readable storage medium having program instructions embodied therewith. The program instructions are executable by a device to cause the device to perform operations comprising: receiving at a device and from a first device a trained discriminator model that has been trained to discriminate between samples from a transmitter of the first device and other transmitters; and discriminating between samples received at the device using the trained discriminator model in order to perform authentication of the transmitter of the first device.

BRIEF DESCRIPTION OF THE SEVERAL VIEWS OF THE DRAWINGS

FIGS. 7A, 7B, and 7C illustrate a training phase, and FIG. 7D illustrates an implementation phase;

FIGS. 9 and 10 are logic flow diagrams of additional methods that might be employed for further optimization in exemplary embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Figure 1:
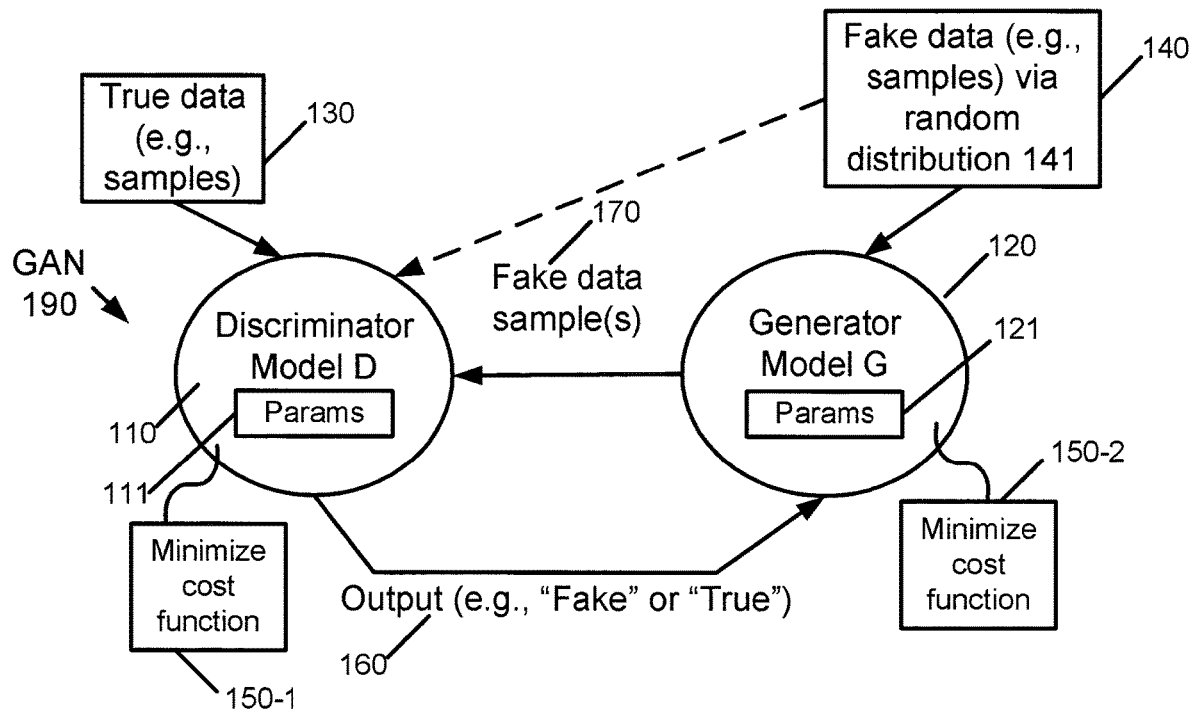
FIG. 1 is a block diagram used to provide an overview of a 'Generative Adversarial Network' (GANs)

With reference to FIG. 1, a 'Generative Adversarial Network' (GAN) 190 generally refers to a network that includes a generator model G 120 and a discriminator model D 110. The discriminator model D 110 may be initially trained to distinguish between actual data (e.g., in true data samples 130) and fake data (e.g., from fake data samples 140) that could be drawn from a random distribution. This initial training of the discriminator model D 110 is not mandatory, and the discriminator model D 110 could be trained along with the generator model G 120. Often for reasons of efficiency and stability of training, a trained discriminator model D 110 is used initially and training is continued with the generator model G 120. The generator model G 120 may be initialized with a random distribution 141 of data samples (for example, a normal distribution). During training of the generator model G 120, a fake sample 140 (or a batch of fake samples 140) is randomly drawn from the generator G distribution 141 and is passed (e.g., as fake data sample(s) 170) to the discriminator model D 110. An actual (also called "true") data sample 130 (or a batch of actual data samples 130) is also passed to the discriminator model D 110.

The discriminator model D 110 in turns tries to discriminate between these samples as true or fake. A 'true sample' is one drawn from the actual data 130 and a 'fake sample' is one generated by G and passed as data 170. The discriminator model D 110 determines whether the known fake samples 170 are indicated by the discriminator as being fake. If not, the parameters 111 are changed so the discriminator model D 110 gets better at discriminating between the true data 130 and the fake data samples 170.

Depending on the output 160 (e.g., of "Fake" or "True") of discriminator model D 110, a cost function is minimized. That cost function could be at the discriminator model D (see cost function 150-1), at the generator model G (see cost function 150-2) or at both the discriminator model D 110 and the generator model G 120. That is, separate cost functions 150-1, 150-2 can be minimized for both the generator G and the discriminator D during training. Typically, the sum of the cost functions 150 is minimized. As such, the parameters 121 (e.g., model weights) of the generator model G 120 are adjusted, which in turn allows the generator model G to learn the distribution of true samples and therefore to mimic that distribution.

That is, the parameters 121 of generator model G 120 and therefore its corresponding random distribution 141 are updated until the discriminator model D 110 is unable to distinguish between the true 130 and fake 140 samples, e.g., with a probability greater than some threshold (such as 50% for example), at which stage the generator model G 120 is said to suitably mimic the distribution of the true data 130. The discriminator model D 110 may be allowed to continually train using both the true 130 and fake 140 samples to enhance its discriminatory power, and the parameters 111 of the discriminator model D 110 may also be modified. The training of the generator and discriminator may be thought of as a game being played between two players (i.e., the discriminator D and the generator G). D 110 gets a point when it is able to correctly distinguish between a true and fake sample. The goal of the G 120 is to generate fake samples 140 that are as close as possible to the true samples 130, such that the D 110 is unable to distinguish between them. If G 120 is able to beat D 110, then G wins. So, every time D is able to distinguish, G updates its weights, so that G can go ahead and generate better fake samples. Here, the parameters imply the parameters 121 of the generator model G.

Various example embodiments herein describe techniques for robust transmitter authentication that use generative adversarial networks. Additional description of these techniques is presented after a system into which the exemplary embodiments may be used is described.

Figure 2:
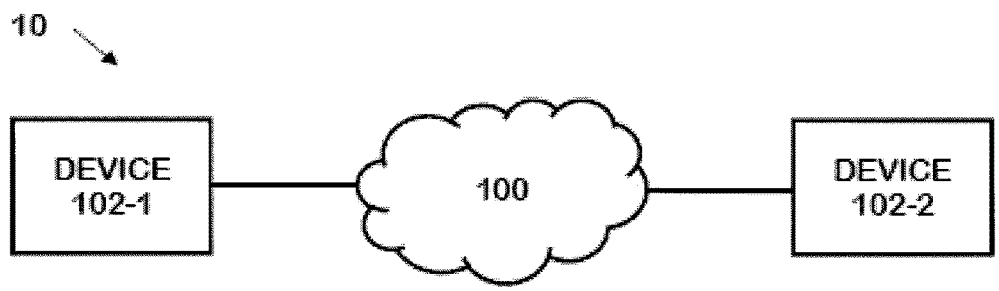
FIG. 2 is a block diagram of one possible and non-limiting exemplary system in which the exemplary embodiments may be practiced.

FIG. 2 is a block diagram of one possible and non-limiting exemplary system in which the exemplary embodiments may be practiced. The system 10 includes devices 102-1, 102-2 that can communicate with each other, and with other computers, via a network 100, where the network 100 may in general comprise one or more component networks and/or internetworks, including the Internet, and may include wired and/or wireless network links. For simplicity, the example shown in FIG. 2 includes only two devices 102-1, 102-2. In particular, the devices 102-1, 102-2 may send and/or receive messages with each other or with other computers. As an example, device 102-1 may transmit a message via a transmitter to device 102-2 (or vice versa) in accordance with a GAN-style framework as discussed in more detail below. In short, the transmitter has a unique, inherent signature so that signals from this transmitter can be distinguished from signals from other transmitters. The device that receives the message can verify the authenticity of the transmitter that sent the message based on the unique signature. Each device 102-1, 102-2 of system 10 may provide functionality for communicating in accordance with the GAN-style framework, such as providing functionality for generating the authentication signal and/or functionality for verifying the authenticity of the transmitter sending such a signal, for example, as described in more detail below.

FIG. 2 is also representative of a scenario where one or more devices 102-1 (such as one or more computers/servers for example) represent a training device that trains one or more network models in accordance with various example embodiments as described herein (such as neural network models as used in a GAN-framework for example). In this case, the one or more devices 102-1 may use and/or distribute the trained models to other devices such as device 102-2 (such as via network 100).

Functionality of devices 102-1, 102-2 of the GAN-style framework may be implemented by logic embodied in hardware or software or a combination thereof. Such logic may be described in the general context of computer system-executable instructions, such as program modules, executed by a computing apparatus. Generally, program modules may include routines, programs, objects, components, logic, data structures, and so on that perform particular tasks or implement particular abstract data types.

Figure 3:
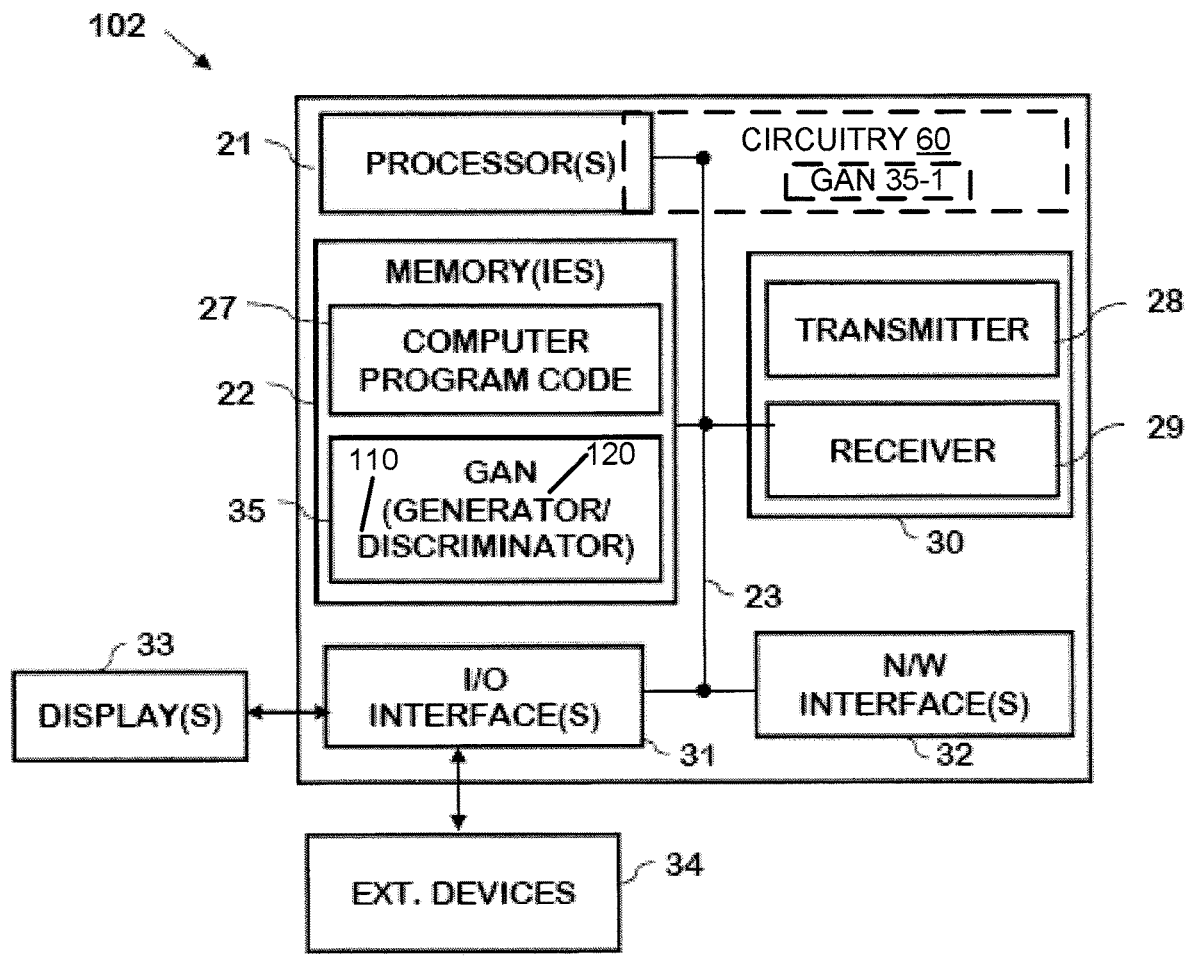
FIG. 3 is a block diagram of an example device in the system shown in FIG. 1.

Turning to FIG. 3, this figure is a block diagram of an exemplary apparatus for implementing a device of system 10. The apparatus is shown in the form of device 102. The components of device 102 may include one or more processors 21, one or more memories 22, one or more transceivers 30, and one or more buses 23 that couple various system components including memory(ies) 22 to processor(s) 21. Each of the one or more transceivers 30 may include a receiver 29 and/or transmitter 28. The one or more transceivers 30 may be connected to one or more antennas (not shown in FIG. 3). Bus 23 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Device 102 may include a variety of computer readable media as memory(ies) 22. Such media may be any available media that is accessible by device 102 including volatile and non-volatile media, and removable and non-removable media. For example, memory(ies) 22 can include computer readable media in the form of volatile memory, such as random-access memory (RAM) and/or cache memory. Device 102 may further include other removable/non-removable, volatile/non-volatile computer system storage media. By way of example only, the computer system storage can be provided for reading from and writing to a non-removable, non-volatile magnetic medium (e.g., a "hard drive" or a "solid-state drive", as examples). Although not shown, a magnetic disk drive for reading from and writing to a removable, non-volatile media (such as USB flash drives or other memories), and an optical disk drive for reading from or writing to a removable, non-volatile optical disk such as a CD-ROM, DVD-ROM or other optical media can also be provided. In such instances, each can be connected to bus 23 by one or more data media interfaces.

Memory(ies) 22 may include computer program code 27 having one or more program modules that are configured to carry out functions of various example embodiments. As an example, computer program code 27 may be stored in memory(ies) 22, which may include computer program code for an operating system, one or more application programs, other program modules, and program data. According to some embodiments, memory(ies) 22 may also store one or more trained discriminator models 110 and/or trained generator models 120 in accordance with a GAN-style framework 35 as discussed in more detail below, and, e.g., which may be similar to the GAN 190 of FIG. 1. Alternatively, or additionally, the GAN-style framework 35-1, including a trained discriminator model 110 and/or a trained generator model 120, may be implemented by logic embodied in hardware (such as programmable gate arrays, integrated circuits, or other circuitry 60). The circuitry 60 may be part of the one or more processors 21 or be separate from the processor(s) 21. Each of the operating systems, one or more application programs, other program modules, and program data, or some combination thereof, may carry out various functions and/or methodologies in accordance with exemplary embodiments.

Device 102 may also communicate with one or more external devices 34 such as a keyboard, a pointing device, a display 33 and/or the like; one or more devices that enable a user to interact with device 102; and/or any devices (e.g., network card, modem, etc.) that enable device 102 to communicate with one or more other devices. Such communication can occur, for example, via Input/Output (I/O) interfaces 31. Also, device 102 may communicate with one or more networks such as a local area network (LAN), a general wide area network (WAN), and/or a public network (e.g., the Internet) via network interface(s) 32. As depicted, network interface(s) 32 communicates with the other components of device 102 via bus 23. It should be understood that although not shown, other hardware and/or software components could be used in conjunction with device 102. Examples include, but are not limited to: microcode, device drivers, redundant processing units, external disk drive arrays, RAID systems, tape drives, and data archival storage systems, and the like.

It is noted that, in some situations, all of the components shown for device 102 in FIG. 2 are not required. As an example, device 102 may correspond to an IoT (Internet of Things) device that includes a sensor (not shown in FIG. 3) and a transmitter 28 without one or more of the other components shown in FIG. 3 (e.g., I/O interfaces 31). In such an example, the device 102 may include a hardcoded output of a GAN generator function (e.g., using some circuitry) in accordance with exemplary embodiments.

Figure 4:
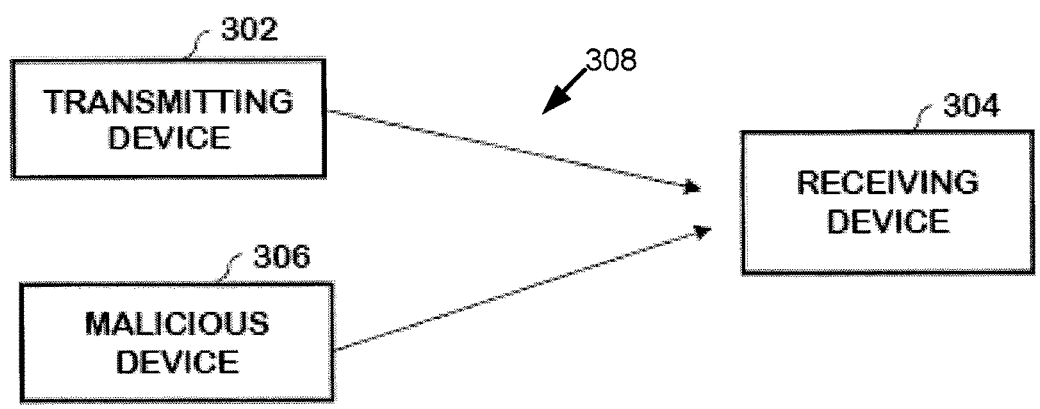
FIG. 4 shows an example of communications between devices.

Referring now to FIG. 4, this figure shows an example of 'signal spoofing'. In this example, a user of a transmitting device 302 (e.g., with a transmitter 28) wants to transmit a signal to a receiving device 304 (e.g., with a receiver 29) over a communication channel 308 (e.g., such as network 100) and desires the signal to be authenticated successfully. When transmitting device 302 transmits a signal using a transmitter, receiving device 304 may use the signature in the received signal to authenticate that the message is indeed from transmitting device 302. In some circumstances, there may be a malicious user of another device, which in FIG. 4 is malicious device 306, eavesdropping on the communication between transmitting device 302 and receiving device 304. Malicious device 306 could then attempt to imitate the signature in the signal sent by transmitting device 302. It is noted that imitating the signature is generally equivalent to learning the non-linear signature introduced in the message signal. Malicious device 306 may then send messages to receiving device 304 with the embedded signature, thus compromising the authentication mechanism. This type of signal imitation may be referred to as 'signal spoofing'. Signal spoofing may be used to launch a so-called "man-in-the-middle" attack, where a malicious actor (i.e., malicious device 306 in the example shown FIG. 4) inserts herself into a conversation between two parties (e.g., transmitting device 302 and receiving device 304), and may impersonate parties and gain access to information that the two parties were trying to send to each other without either outside party knowing until it is too late.

Although encryption may help prevent problems such as signal spoofing, the rate at which the signal values are generated makes it difficult to encode and also decode without dropping samples. The delay introduced by encryption schemes is often too high for it to be a useful in some applications. Moreover, encryption can be too expensive in terms of power consumption for low power devices, such as devices (e.g., low power sensors) in an internet of things (IoT) scenario for example. In order to save power, various example embodiments provide simple transmitter authentication with no encryption while maintaining security.

Figure 5:
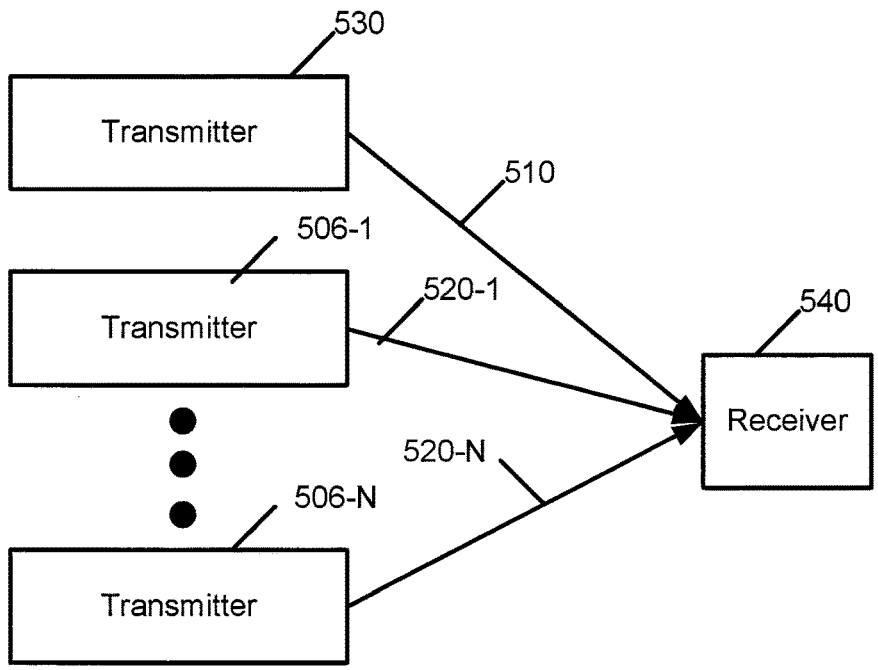
FIG. 5 illustrates transmissions by multiple transmitters to a single receiver.

An additional issue is represented by FIG. 5, which illustrates transmissions by multiple transmitters 530, 506 to a single receiver 540. There is a "local" (e.g., to the receiver 540) transmitter 530, and N "remote" transmitters 506-1 to 506-N. The receiver 29 would like to authenticate transmitter 28 from the other transmitters 506. One or more of the transmitters 506 may be part or all of a malicious device 306, although this is not necessary. Transmitter authentication using machine learning systems involve training with both positive samples (identifying a transmitter signature, e.g., from the transmitter 28) and negative samples (from all the other transmitters 506).

In a possible scenario, positive samples for a transmitter 530 are collected using a loop-back technique where a transmitter output (signal 510) is locally received and analyzed. Negative samples are generated by collecting the signals 520-1 through 520-N transmitted from other transmitters 506. This collection is performed by the receiver 540.

In large-scale wireless transmitter receiver systems, negative sample collection is expensive in terms of energy and time. Therefore, for a given training set size, it is critical to optimize the negative sample generation process to improve authentication accuracy (defined typically as misclassification rate) over a test set. One goal is to learn a binary classifier that is able to accurately identify the positive samples and classify all other samples as negative ones.

One intuition to meet this goal is to refine a decision boundary for the positive class such that the boundary is as strict as possible (with respect to the positive samples). In an exemplary embodiment, differentiating the negative samples is not important, but all of these samples are instead grouped as not-positive.

Consequently, in an exemplary embodiment, we propose a targeted negative sample generation process that is based on minimizing an appropriately chosen distance metric between the generated negative samples and the positive samples. One possible instantiation is a GAN-based training, in which a Kullback-Leibler (KL) divergence between the true and fake distributions is minimized.

Before proceeding with additional detailed examples, it is helpful at this point to provide a conceptual overview. As stated above, one intuition is to refine a decision boundary for the positive class such that the boundary is as strict as possible (with respect to the positive samples). Turning to FIG. 6A, this is a diagram of a how GAN training affects decision boundaries for different classes of samples. Assume there are four devices 102-1, 102-2, 102-3, and 102-4, each producing positive samples from its own transmitter 28, corresponding to one of the classes 1, 2, 3, or 4, respectively. The discriminator model D 110 is assumed to be in the device 102-1, and each of the devices 102-2, 102-3, and 102-4 is illustrated as having a corresponding generator model G 120. Thus, this is primarily used to illustrate how the discriminator model D 110 on one device can discriminate from transmitters on other devices.

On the left side 601 is an illustration of how these classes might be viewed by a discriminator model D 110 prior to performing GAN training process 600. Note there decision boundaries (illustrated by lines between the classes) are small and there are areas where three classes are close together.

On the right side 603 is an illustration of how these classes might be viewed by the discriminator model D 110 after GAN training process 600 has been performed. It can be seen that the positive samples for the classes are now consolidated into defined regions, and the boundaries between the regions and corresponding classes are larger.

What this means is that a discriminator model D 110 using receiver 29 in the device 102-1 can determine samples from its own transmitter 28 and distinguish (to a higher degree than in 601) these samples from samples from other transmitters 28 from other devices 102-2, 102-3, and 102-4. For instance, samples from classes 2, 3, and 4 are negative samples for a classifier being trained to discriminate between class 1 and remaining classes. The same for the other class discriminators as well. Additionally, anything outside the confines of a class, such as in region 606, would also be considered by a classifier trained to discriminate between class 1 and remaining classes to be outside class 1. This might occur for a new transmitter not belonging to classes 2, 3, or 4.

While FIG. 6A provides a visual representation of how GAN training process 600 might work, it is also possible to provide an analogy. Assume classes 1-4 are now handwriting samples, each from a corresponding Person 1-4. Initially, a discriminator would not know, given samples of handwriting from each of the Persons 1-4, which samples belonged to which Person. If the discriminator for class 1 would be given samples taken from Person 1, that discriminator model could learn how to determine that those samples are handwriting and also would know they are for Person 1 (e.g., the samples would be labeled as belonging to Person 1). However, the discriminator model D 110 would have a very difficult time distinguishing these samples from samples from Persons 2, 3, and 4.

This is where the generator model G 120 of Person 2 comes in. Person 2 tries to copy, that is "spoof", the handwriting of Person 1. Person 2, however, has his or her own individual handwriting characteristics, perhaps a small "loop" for a certain character, where Person 1's handwriting does not have this loop for this character. This spoofed handwriting is labeled as being false and is passed to the discriminator model D 110. The discriminator model D 110 then determines whether the spoofed handwriting would be determined as a positive (e.g., True) sample or a negative (e.g., Fake) sample. Since the discriminator model D 110 knows the handwriting is spoofed, in response to the discriminator model D 110 determining its output was positive (which is an incorrect result), the discriminator model D 110 would revise its parameters accordingly. By contrast, in response to the discriminator model D 110 determining its output was negative, the discriminator model D 110 would not revise its parameters. The discriminator model D 110 sends its output of, e.g., "Fake" (a negative sample) or "True" (a positive sample) to the generator model G 120 for Person 2. In response to the output being a negative sample, the generator model G 120 of Person 2 adjusts its weights. The consequence of adjusting the weights of G means that Person 2's next attempt at spoofing the handwriting of person 1 should be better, that is, more accurate. For the previous example of the small "loop" for a certain character for Person 2's handwriting, perhaps the loop would be even smaller or nonexistent.

This process is iterative: Person 2 and its generator model G 120 keep getting better at spoofing Person 1's handwriting; and Person 1 and its discriminator model D 110 keep getting better at determining which handwriting is spoofed and which handwriting is its own. At some point, this process ends. This may be when the discriminator model D 110 is unable to distinguish between the true 130 and fake 140 samples, e.g., with a probability greater than some threshold (such as 50% for example). In order to determine this, some distance metric between the samples is used, such as a Kullback-Leibler (KL) divergence between the true and false distributions, which may be minimized according to the threshold.

The Persons 3 and 4 may also perform this process, trying to spoof Person 1's handwriting. This will provide additional data to cause the discriminator model D 110 to refine further its parameters 111 and to be able to distinguish Person 1's handwriting from other handwriting (including handwriting from a malicious device 306).

While the teachings herein contemplate using GAN training process 600 between two devices 102-1 and 102-2, it is also possible to use GAN training 600 using multiple devices 102. For instance, in the example of FIG. 6A, each of the devices 102-2, 102-3, and 102-4 may have its own generator model G 120 and perform a GAN training process 600. This improves the discriminator model D 110 for the device 102-1.

Figure 6B:
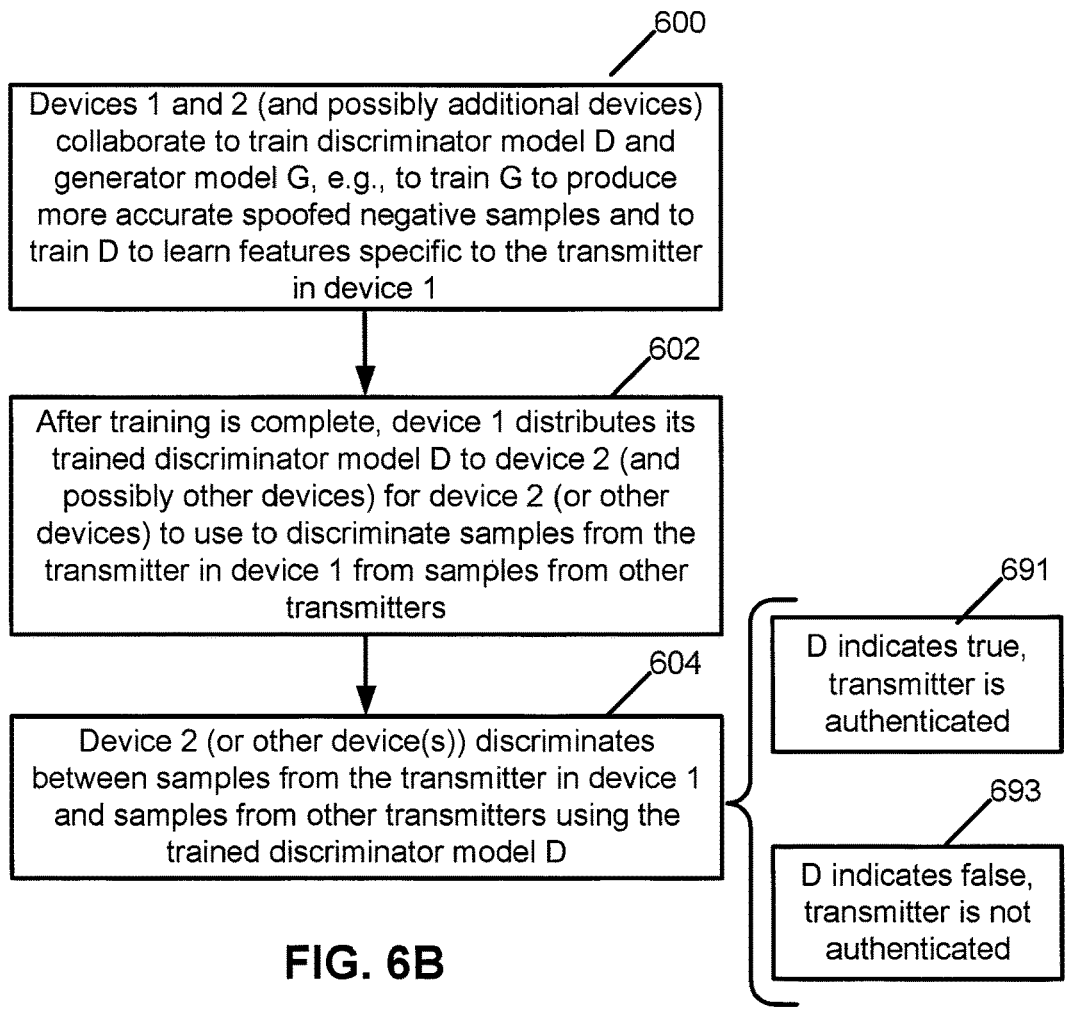
FIG. 6B is a logic flow diagram of a method for efficient bootstrapping of transmitter authentication and use thereof, in accordance with an exemplary embodiment.
Figure 6A:
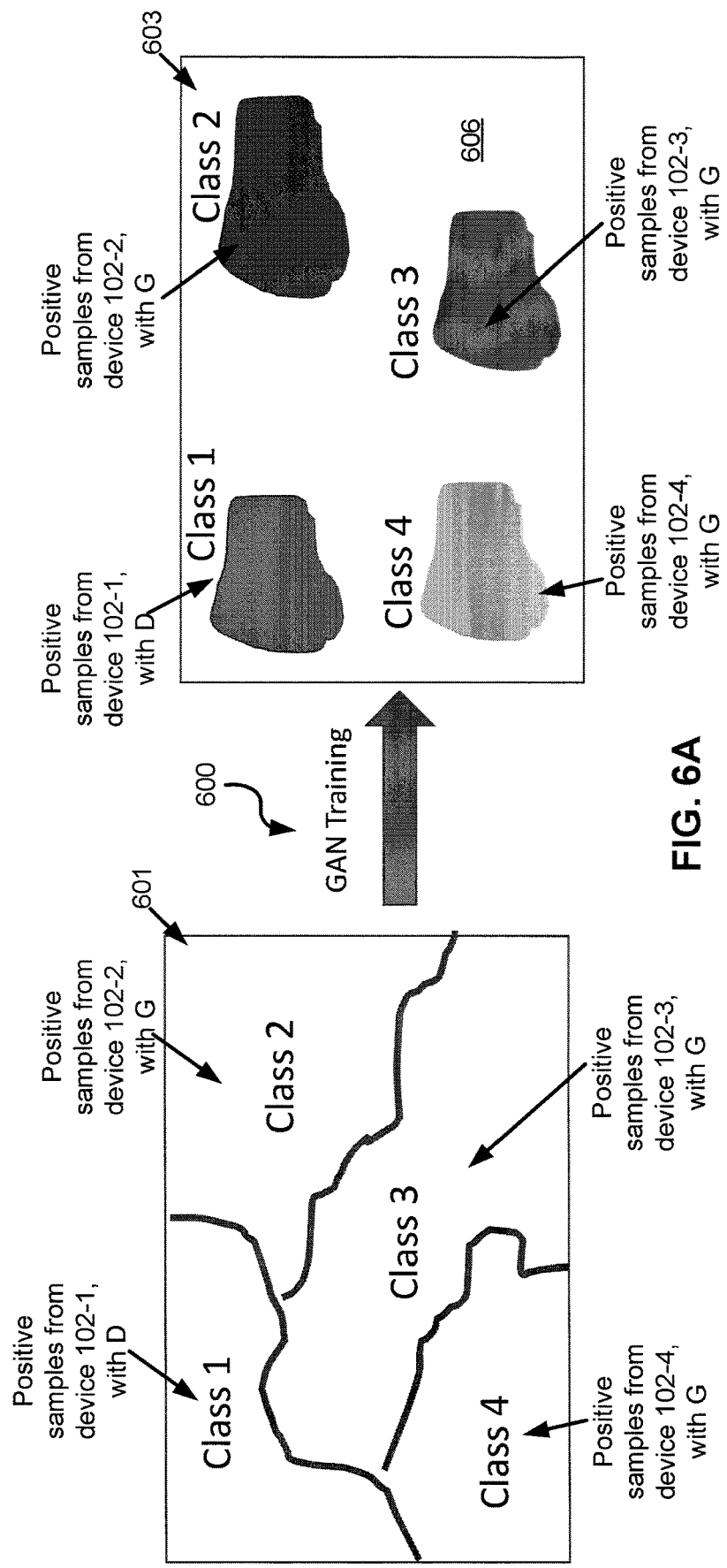
FIG. 6A is a diagram of a how GAN training affects decision boundaries for different classes of samples.

FIG. 6B is used as an overview of efficient bootstrapping of transmitter authentication. More particularly, FIG. 6B is a logic flow diagram of a method for efficient bootstrapping of transmitter authentication and use thereof, in accordance with an exemplary embodiment. Block 600 is a GAN training process as previously described above, in the form of an overview. Additional details are provided below. In block 600, two devices 1 and 2 collaborate to train discriminator model D 110 and generator model G 120, e.g., to train the generator model G 120 to produce more accurate spoofed negative samples 170 and (e.g., therefore) to train the discriminator model D 110 to learn features specific to the transmitter in device 1. It is assumed, though not required, that this GAN training process 600 would be performed by the two devices before communication between them begins. This is a training phase, and is also considered to be bootstrapping the system, e.g., so that the devices are prepared for communications using transmitter authentication prior to actual communication (other than that used for the GAN training process 600) being performed. Note that this GAN training process 600 can be performed between additional devices, such as devices 1 and 3, devices 1 and 4, and the like. This is described in more detail below.

Blocks 602 and 604 can be considered to be part of an implementation phase, where the devices 1 and 2 (and other devices) communicate using transmitter authentication. In block 602, after training is complete, device 1 distributes its trained discriminator model D to device 2 (and possibly other devices) for device 2 (or other devices) to use to discriminate samples from the transmitter in device 1 from samples from other transmitters. In block 604, the device 2 (or other devices) discriminates between samples from the transmitter in device 1 and samples from other transmitters using the trained discriminator model D. Note that it is also possible that another device 102 that has not participated in a GAN training process 600 with device 1 102-1 could also be sent the trained discriminator model D 110 and use the trained discriminator model D 110 to discriminated received samples from transmitters, in order to authenticate the transmitter for the device 1 102-1. The device 102 using the discriminator model D 110 D, in response to the discriminator model D 110 indicating true (i.e., the sample is from a transmitter belonging to device 1), authenticates the transmitter in block 691. Typically, this would result in a communication session between the device 102 using the discriminator model D 110 D and device 1. The device 102 using the discriminator model D 110 D, in response to the discriminator model D 110 indicating false (i.e., the sample is not from a transmitter belonging to device 1), does not authenticate the transmitter in block 693. Typically, this would prevent a communication session from being performed between the device 102 using the discriminator model D 110 D and whichever device has sent the sample.

Figure 7A:
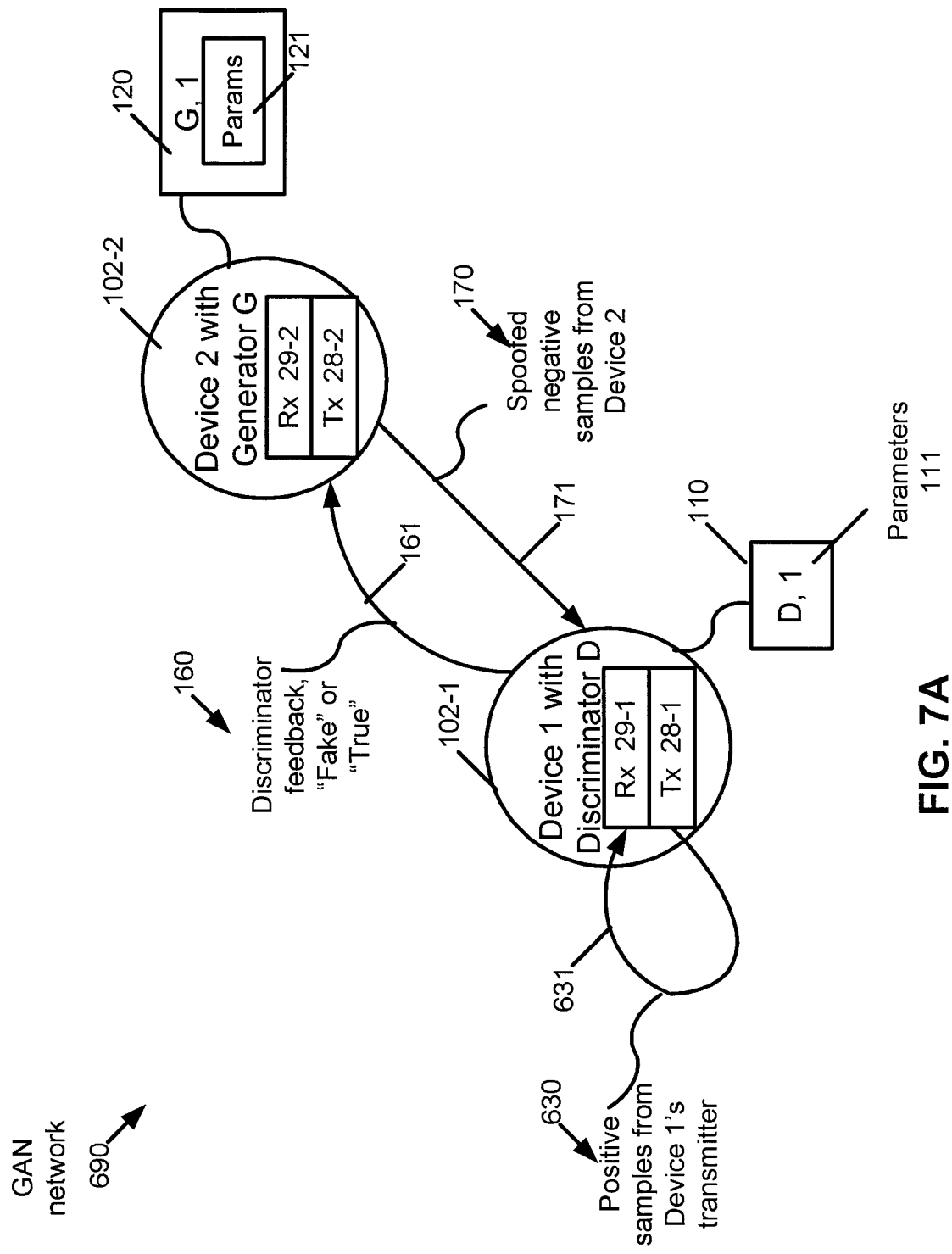
FIGS. 7A, 7B, 7C, and 7D are diagrams of GAN networks with multiple devices communicating in accordance with exemplary embodiments, where

FIG. 7A is a diagram of a GAN network 690 of multiple devices communicating in a training phase in accordance with exemplary embodiments. This figure is used to introduce and describe exemplary embodiments, and there are two devices in the GAN network 690: a device 1 102-1 with a discriminator model D 110; a device 102-2 with a generator model G 120. This structure is similar to the structure in FIG. 1.

The device 1 102-1 comprises a receiver (Rx) 29-1 and a transmitter (Tx) 28-1; device 2 102-2 comprises a receiver (Rx) 29-2 and a transmitter (Tx) 28-2. The device 2 102-2 sends (via Tx 28-2) spoofed negative samples 170 via signal 171. The device 1 102-1 sends (via Tx 28-1) positive samples 630 over signal 631 from its transmitter Tx 28-1, which are received by Rx 29-1, and also sends discriminator feedback 160 (e.g., comprising indications of "Fake" or "True") via signal 161 to the device 2 102-2.

A training setup (e.g., bootstrapping before communication) using the GAN network 690 is as follows. The devices 102-1 and 102-2 are agents with their own transmitters and receivers—each introducing hardware specific non-linearities. The device 1 102-1 collaborates with device 2 102-2 to train a discriminator (e.g., discriminator model D 110) to accurately authenticate her own transmitter 28-1 signature. The positive samples 630 are collected from device 1's own transmission and negative samples (spoofed negative samples 170) are from device 2 102-2. The device 102-2 trains a generator (e.g., generator model G 120) to spoof a signal from the device 1's transmitter 28-1. Note, there is likely not a reason for device 1 102-1 in trying to train a generator, as the non-linearities due to device 2 102-2 are unique to the transmitter 28-2 in the device 2.

Initially, one issue is there are loosely defined decision boundaries as described above in reference to FIG. 6A. That is, this discriminator D 110 has loosely defined class boundaries because of a lack of sufficient negative training data. To address this, a signature (decision boundary) refinement may be performed. In a "signature generation" phase of this refinement, the device 2 102-2 tries to actively spoof the signature of the Tx 28-1 of the device 1 102-1 by training the generator model G 120. The device 2 102-2 sends the spoofed negative samples 170 to device 1 120-1. The device 1 120-1 sends discriminator feedback 160 (e.g., of "Fake" or "True") for each spoofed negative sample 170 from the device 2 102-2. Every time the discriminator model D 110 is able to accurately distinguish between the real signal and the spoofed signal 170 from the device 2 102-2 (that is, the discriminator feedback 160 is indicated as being "Fake"), the parameters 121 (e.g., weights) of the generator model G 120 are adjusted for better spoofing. Additionally, since the discriminator model D 110 knows the spoofed negative samples 170 are fake, if the discriminator model D 110 cannot distinguish the spoofed negative samples 170 from real signals (that is, the discriminator model D 110 indicates a spoofed negative sample 170 is "True" instead of the correct answer of "False"), the discriminator model D 110 adjusts its parameters 111 so that D will become better at determining the spoofed negative samples are fake.

Alternately training the discriminator model D 110, e.g., between positive samples 630 and negative samples 170, to distinguish the spoofed signal 171 causes the discriminator model D 110 at the device 1 120-d to learn features that are specific to the Tx hardware in the Tx 28-1. This causes the discriminator (e.g., a binary classifier) to serve as an effective authenticator for the signals from the Tx 28-1, while rejecting signals from other transmitters.

Figure 7B:
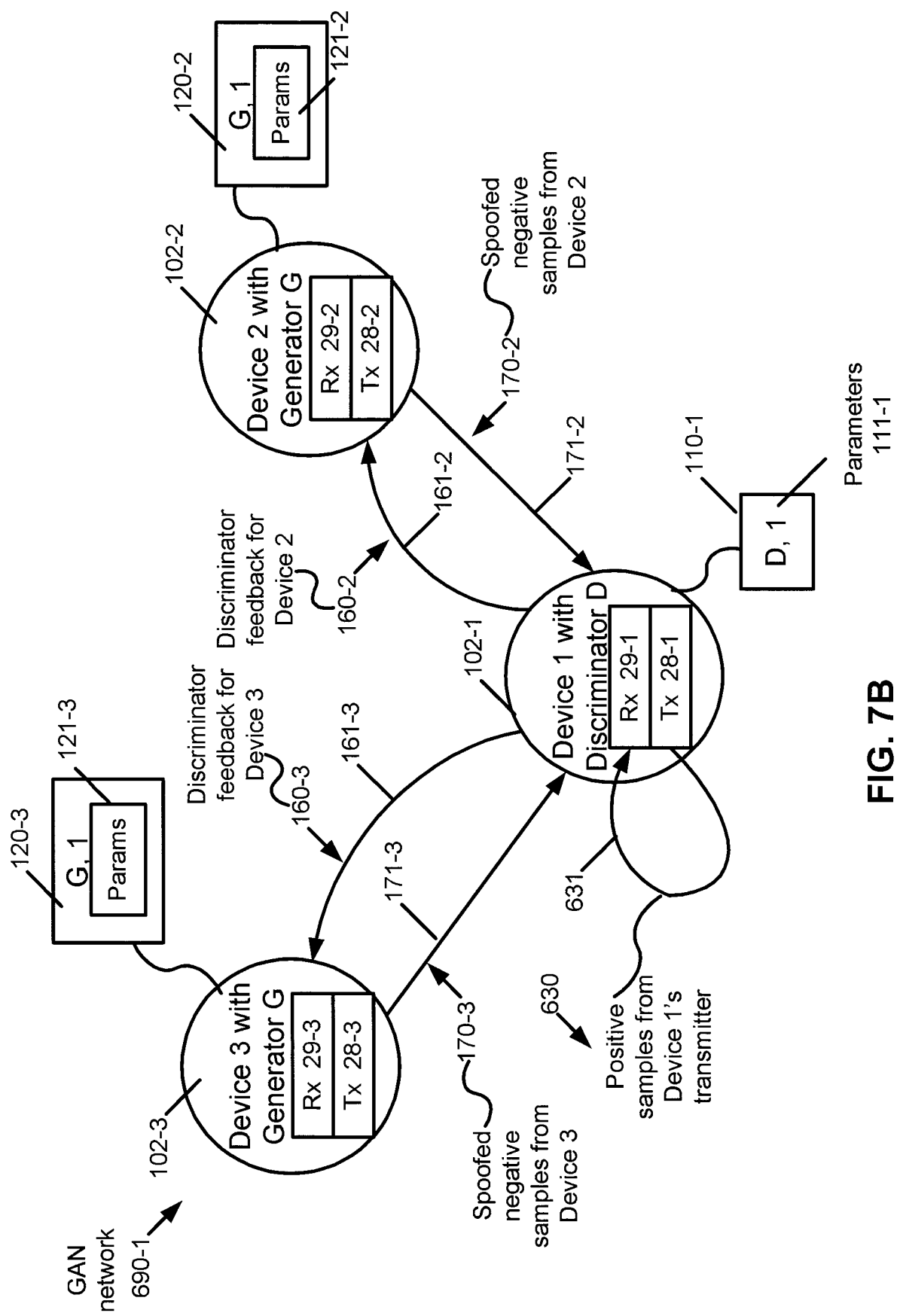

FIG. 7A is directed to a simple example where discriminator model D 110 is trained using one device, device 2 102-2. FIG. 7B illustrates a more complex example of GAN network 690-1 in a training phase, where the discriminator model D 110 is trained using both devices 2 and 3. Each device 2 102-2 and 3 102-3 has its own generator model G 120-2, 120-3, respectively. These are specific to device 1 102-1, and are therefore labeled as "G, 1". Each device 2 102-2 and 3 102-3 sends its corresponding spoofed negative samples 170-2, 170-3 to the device 1 102-1 using signals 171-2 and 171-3, and also receives discriminator feedback 160-2, 160-3 using signals 161-2, 161-3. The discriminator model D 110-1 in the device 1 102-1 is labeled as "D, 1", as there is only one discriminator in this device and this example, which discriminates from all three transmitters 28-1, 28-2, and 28-3. Each device 2 102-2 and 3 102-3 adjusts its own generator model G 120-2, 120-3, as described above. Similarly, the device 1 102-1 adjusts its discriminator model D, 1 110-1 as described above, but using data from both devices 2 and 3.

Figure 7C:
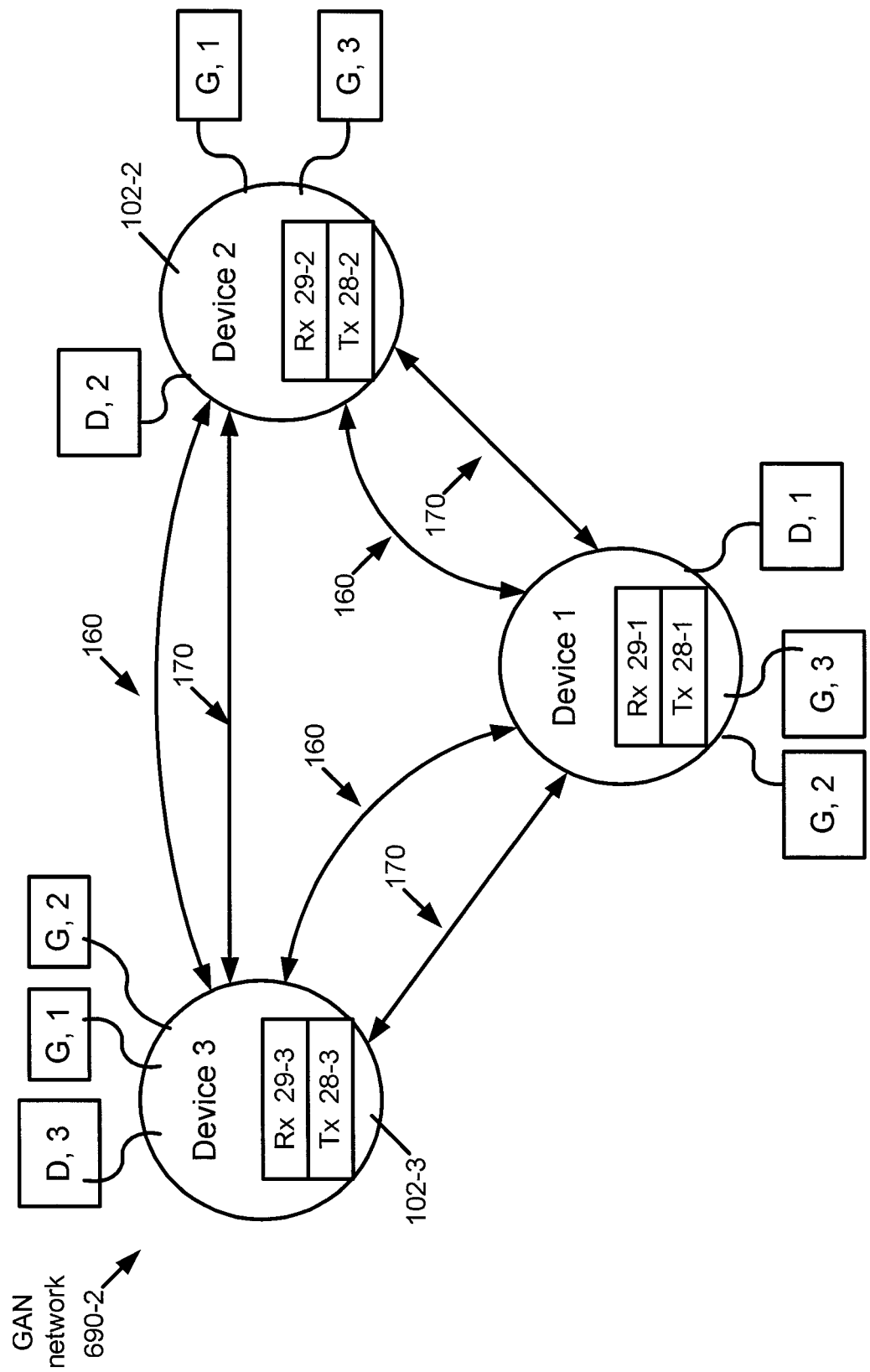

FIG. 7C illustrates an even more complex example of GAN network 690-2 in a training phase, where each device 102 performs both training of a discriminator model D 110 and also training of multiple generator models G. For ease of reference and clarity, a lot of the reference numerals have been eliminated or modified to be simpler. The following are performed: a discriminator model D, 1 is trained by device 1 102-1 using both devices 2 and 3; a discriminator model D, 2 is trained by device 2 102-2 using both devices 1 and 3; and a discriminator model D, 3 is trained by device 3 102-3 using both devices 1 and 2. As can be seen, each device 102 has only one discriminator model D, but has two generator models G. For instance, the device 1 102-1 has the discriminator model D, 1, but has generator models G, 2 and G, 3. Generator model G, 2 for the device 1 is developed during a GAN training process 600 between device 2 and device 1, where the device 2 develops its discriminator D, 2. Generator model G, 3 for the device 1 is developed during a GAN training process 600 between device 1 and device 3, where the device 3 develops its discriminator D, 3. The other generators G in the devices 2 and 3 are similarly determined.

Figure 7D:
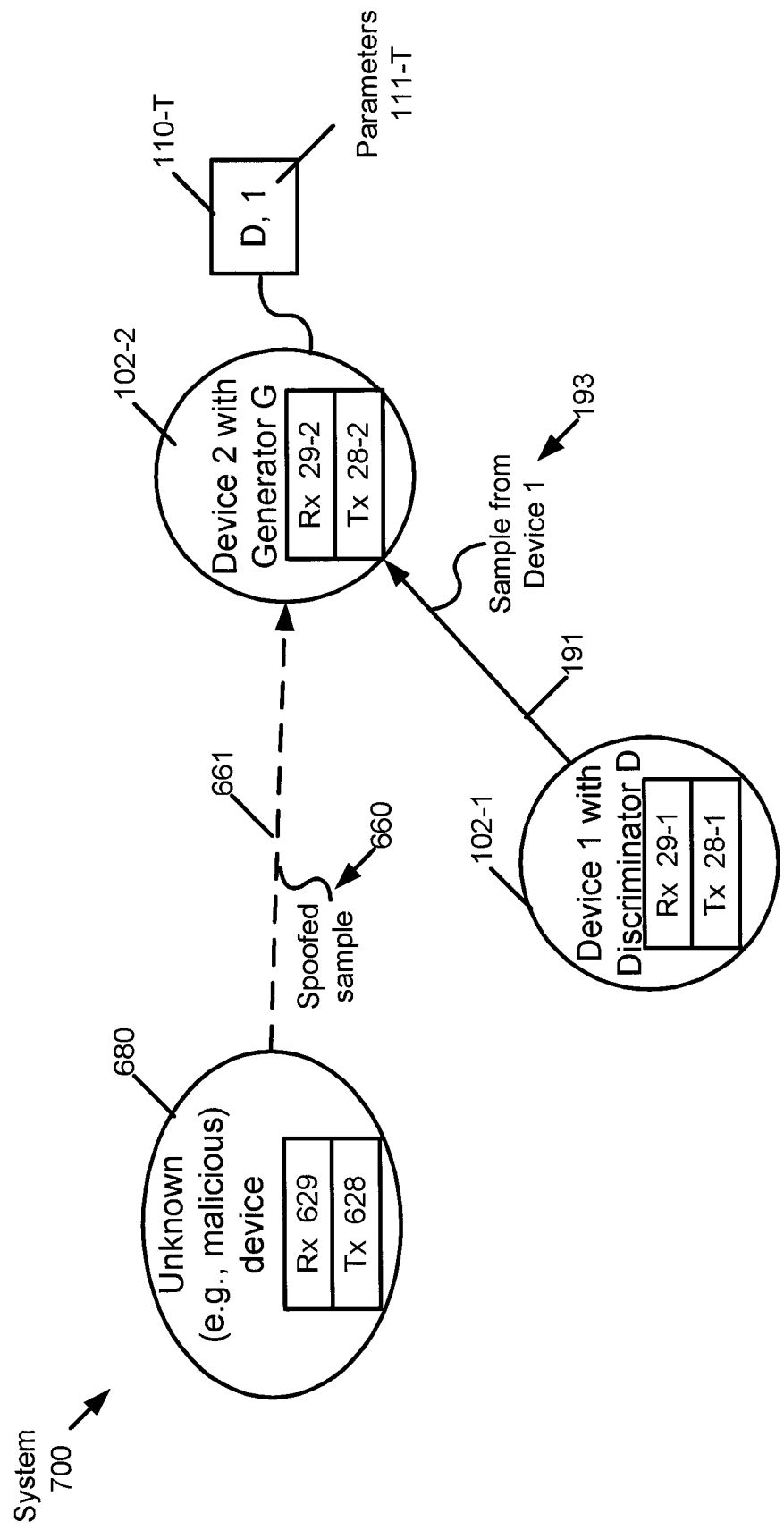

FIG. 7D is an example of a system 700, this time in an implementation phase. FIG. 7D assumes the training phase of block 602 of FIG. 6B has been completed and the device 1 102-1 has distributed its trained discriminator model D 110-T, with trained parameters 110-T, to the device 2 102-2. FIG. 7D is used to illustrate block 604 of FIG. 7B, where the device 2 102-2 discriminates using the discriminator model D 110-T. The system 700 comprises the two devices 102-1 and 102-2, where an unknown and potentially malicious device 680 transmits to the device 2 102-2. The unknown device 680 has a receiver, Rx, 629 and a transmitter, Tx, 628. The "spoofed" sample 660 (or normal sample, if the unknown device 680 is not malicious) on signal 661 should be discarded by the discriminator model D 110-T in the device 2 102-2, as being non-positive. That is, not being a real sample from the transmitter 28-1 of the device 1 102-1. Meanwhile, the device 2 102-2 should authenticate the transmitter 28-1 from the device 1 102-1 by discriminating the sample 193 from the device 1 on the signal 191 as belong to the transmitter 28-1 from the device 1 102-1.

Figure 8:
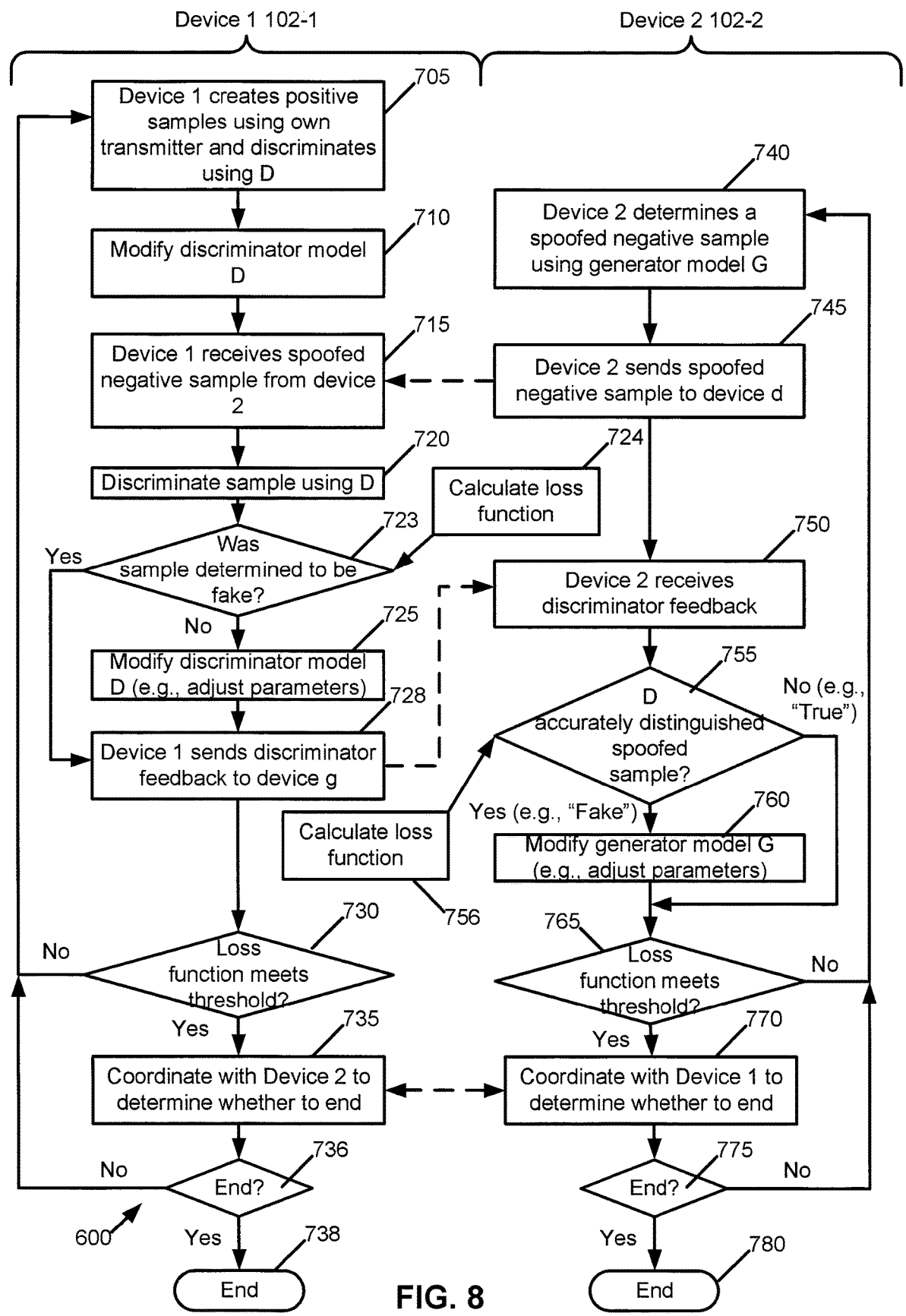
FIG. 8 is a logic flow diagram of methods performed by devices implementing a discriminator model and a generator model in order to perform part of the method in FIG. 6B, in accordance with exemplary embodiments.

Turning to FIG. 8, this is a logic flow diagram of methods performed by devices implementing a discriminator model and a generator model in order to perform part of the method in FIG. 6B, in accordance with exemplary embodiments. This illustrates block 600 of FIG. 6B. In FIG. 8, blocks 705-738 are performed by the device 1 102-1, with the discriminator model D 110, e.g., using part or all of a GAN-style framework 35 implemented in hardware, software, or a combination of these as described in reference to FIG. 3. Blocks 740-780 are performed by the device 2 102-2, with the generator model G 120, e.g., using part or all of a GAN-style framework 35 implemented in hardware, software, or a combination of these as described in reference to FIG. 3. The dashed lines between blocks 715 and 745, between blocks 728 and 750, and between blocks 770 and 735 indicate that data passes between devices 1 and 2. The flows for each of the devices 1 and 2 are independent, but data passes between the two devices 102.

In block 705, the device 1 102-1 creates positive samples 630 using its own transmitter 28-1 and discriminates using the discriminator model D 110. The device 1 may modify the discriminator model D 110 in block 710, e.g., by changing the parameters 111, e.g., if the discriminator model D 110 does not correctly discriminate the positive sample 630 as a positive sample. In block 740, the device 2 102-2 determines a spoofed negative sample 170 using generator model G 120. The device 2 102-2 sends this spoofed negative sample 170 to device 1 102-1, in block 745. In block 715, the device 1 102-1 receives the spoofed negative sample 170 from device 2 102-2. In block 720, the discriminator model D 110 discriminates the sample 170 using the discriminator model D. In block 723, the discriminator model D 110 determines whether the sample was determined to be fake. Note that the discriminator model D 110 knows the sample 170 is fake. In block 723, the device 1 102-1 calculates a loss function. This is indicated by block 724, and is described in more detail below. If the sample was determined to be fake (block 723=Yes), this means the discriminator model D 110 determined the correct outcome, and the flow proceeds to block 728. If the sample was determined to be real (block 723=No), this means the discriminator model D 110 determined the incorrect outcome, and therefore the discriminator model D 110 should be modified. The device 1 102-1, in block 725, modifies discriminator model D 110 accordingly. This could include adjusting the parameters 111. In block 728, the device 1 102-1 sends discriminator feedback 160 to the device 2 102-2. As indicated previously, this feedback 160 could be an indication of "Fake" for a sample considered by the discriminator model D 110 to be not-positive (e.g., not from Tx 28-1) or an indication of "True" for a sample considered by the discriminator model D 110 to be positive (e.g., from Tx 28-1). Note that other indications might be used, such as "True" and "False"; "Positive" and "Not-Positive"; and the like.

In block 750, the device 2 102-2 receives discriminator feedback 160 and in block 755 determines whether the discriminator model D 110 accurately distinguished the spoofed sample 170. Block 755 can also involve calculating a loss function (see block 756). If so (step 755=Yes (e.g., "Fake")), in block 760 the device 2 102-2 adjusts parameters 121 of generator model G 120. If not (step 755=No (e.g., "True")) or block 760 has been performed, the flow for device 2 102-2 proceeds to block 765.

In block 730, device 1 102-1 determines whether the loss function has met a threshold. In block 765, device 2 102-2 determines whether the loss function has met a threshold. This may involve determining a distance metric between generated negative samples 170 and positive samples 630. As described above, one instantiation is a GAN-based training, in which the KL-divergence (as a distance metric) between the false and true distributions is measured (e.g., in blocks 724 and 756) and is minimized (e.g., in blocks 730, 765). The minimization is determined in response to the discriminator model D 110 being unable to distinguish between the true 630 and fake 170 samples with a probability greater than some threshold (such as 50% for example). If the loss function (e.g., as a distance metric) does not meet a threshold (blocks 730, 765=No), the flow continues at blocks 705, 740, respectively, where additional iterations are made to improve the discriminator model D 110 and generator model G 120.

In more detail, the GANs may be trained to make the "fake" distribution modeled by the generator G to be as close as possible (with respect to some metric) to the "true" distribution. There are several metrics that are used to compute this distance between the distributions. This includes the following:
  a. KL Divergence (see block 766);
  b. Mean Squared Error;
  c. Wasserstein Metric;
  d. Total Variation distance;
  e. Jensen-Shannon Divergence,
and additional metrics. Each metric has its own advantages (in terms of stabilizing GAN training). For instance, Wasserstein GANs are currently popular.

The stopping criterion for training GANs is not very well defined. Ideally, we want to stop when the discriminator D is fooled 50% of the time, when presented with fake samples from the generator G.

While training GANs, we can keep track of the discriminator and generator loss functions, where the loss functions are used to track how well the discriminator and the generator models are trained. One typical stopping criterion is when the generator loss gets equal to the discriminator loss. However, that in practice does not happen often. So, one possibility instead is to look at individual loss functions (e.g., their growth), how the generated data looks, and stop when we see no improvement in the quality of the generated data. In this case, the threshold could be a lack of (e.g., zero) improvement in the quality of the generated data.

In other words, it is difficult to train a GAN to achieve equilibrium (creates instability and so on), so instead in practice, one useful idea is to jointly minimize the loss functions (see blocks 724 and 730, and 756 and 765), i.e., minimize the generator loss function by optimizing the parameters (in blocks 725 and 760), then use the same parameters to minimize the discriminator/generator loss functions and in the process optimize them again. These two steps may be repeated in synchronization until both the loss functions have a reached a low enough value.

The question is the following: where does one stop training? There is no good answer to that question. Typically, one may stop when the loss values (e.g., of the loss functions) are no longer changing appreciably for one or both of the generator and discriminator and they are sufficiently low. A single threshold in this case would be a loss value of a loss function that is no longer changing appreciably for either the generator or discriminator and the loss value is sufficiently low. Sometimes, we look for the setting when they are equal. At other times, we use a manual Turing test (especially for images). In the instant case, the generator and the discriminator need to cooperate for training as well as for stopping. One way to do this is to have pre-determined thresholds for both the generator and the discriminator loss functions. We can then, for this example, continue training until the loss values are above these thresholds and stop otherwise. These thresholds (e.g., as used in blocks 730, 765) themselves could be obtained through out-of-band experiments and/or prior experience.

In block 735, the device 1 102-1 coordinates with device 2 to determine whether to end, and in block 770, the device 2 102-2 coordinates with device 1 to determine whether to end. If the devices 102-1, 102-2 determine to end the GAN training process 600, blocks 736 and 775 will both be Yes, and the flows continue to blocks 738 and 780, respectively.

If the devices 102-1, 102-2 determine not to end the GAN training process 600, block 736 and 775 will both be No, and the flows continue to blocks 705 and 740, respectively.

After the GAN training process 600 ends for these two devices 102-1 and 102-2, it is possible for this process to be performed with additional devices. For instance, another GAN training process 600 could be performed between devices 102-1 and 102-3, as illustrated by FIG. 7B. FIG. 7C also shows that multiple GAN training processes 600 may be performed for multiple devices 102-1, 102-2, and 102-3.

The trained discriminator model D 110 may then be used to discriminate incoming received signals from other transmitters. This has been described above in reference to step 604 of FIG. 6B, and also in reference to FIG. 7D.

There are some additional possible optimizations that might be performed. For instance, depending on the hardware for a transmitter 28, the nonlinearities associated with the hardware might change over time. FIG. 9 addresses this possibility by periodically updating the discriminator model D 110. That is, a device 102 would periodically update the discriminator model D 110. This period could be, e.g., months or years, depending on the hardware and programming of the device 102. Note that after updating, block 602 of FIG. 6B could be performed, to distribute the updated discriminator model D 110.

Transmitters 28 may also be affected by temperatures. For instance, IoT transmitters might be in an environment outside a conditioned space. Based on this, a device 102 could train its discriminator model D 110 for different temperatures. Those temperatures could be ambient temperatures surrounding the device 102, or be temperatures in or on the device 102 or any part thereof (e.g., in or on the transmitter). FIG. 10 illustrates a flow diagram for this example. In block 1010, the device 102 trains its discriminator model D 110 for different temperatures. That is, the GAN training process 600 would be used for each temperature being used.

Temperature ranges might be used. For instance, a device 102 might perform training in block 1010 if the temperature is below freezing, within a range from freezing to 80 F, and also higher than 80 F. If a current temperature is below freezing, one discriminator model D 110 would be used; if a current temperature is above freezing but below 80 F, another discriminator model D 110 is used; and if the temperature is above 80 F, a third discriminator model D 110 might be used. Note also that very high temperatures could be used, such as above 150 F, in case an IoT device has direct sun exposure. These might also be automatic, such that if an IoT device is placed into service at 65 F, training would be performed at that temperature. If the temperature varies by a certain amount (e.g., 30 F) from there, training would be performed at the new temperature, and therefore two, three, or more temperature ranges could be used (e.g., below 30 F, between 30 F and 90 F, and above 90 F). Other implementations are also possible. After these processes are complete, the device 102 distributes (see block 1015) trained discriminator models D and also different temperature ranges applicable to the models.

Blocks 1020 and 1030 are used by a device that receives the trained discriminator models D and also different temperature ranges applicable to the models. This could be a device that cooperated with the original device 102 that created the trained discriminator model D 110, in order to train the model D, or a device that did not perform any cooperation. The device determines a current temperature in block 1020 and in block 1030 selects an appropriate discriminator model D based on the determined temperature. Block 604 of FIG. 6 would be performed using the appropriate discriminator model D.

For variation of the non-linearity due to temperature (such as in FIG. 10), time (such as in FIG. 9), and the like, the devices 102, such as IoT devices, can include sensors that capture the temperature or time or other state parameters on the IoT device and convey that information to the discriminator so that the discriminator model D can be updated. One exemplary paper that discusses such sensors is the following: J.-. Plouchart et al., "Adaptive Circuit Design Methodology and Test Applied to Millimeter-Wave Circuits," in IEEE Design & Test, vol. 31, no. 6, pp. 8-18, December 2014.

Although the primary emphasis herein is placed on wireless communications and authentication of wireless transmitters, the techniques herein may also be applied to wired communications (such as via Ethernet or other wired connections) and authentication of such wired transmitters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    training, using a generative adversarial network comprising a first device and a second device, a discriminator model in the first device to discriminate samples from a transmitter in the first device from samples from other transmitters, the training performed at least by collaborating by the first device with the second device to train the discriminator model to discriminate between samples from its transmitter and spoofed samples received from a generator model in the second device and to train the generator model in the second device to produce more accurate spoofed samples received by the first device during the training, wherein the training results in a trained discriminator model; and
    distributing the trained discriminator model from the first device to another device for use by the other device to discriminate samples received by the other device in order to perform authentication of the transmitter in the first device,
    wherein training comprises training, using the generative adversarial network additionally comprising a third device, the discriminator model in the first device to discriminate samples from the transmitter in the first device from samples from other transmitters, the training performed at least by collaborating by the first device with the third device to train the discriminator model to discriminate between samples from its transmitter and spoofed samples received from a generator model in the third device and to train the generator model in the third device to produce more accurate spoofed samples received by the first device during the training.

2. The method of claim 1, wherein training comprises:
    receiving at the first device a spoofed sample from the second device;
    discriminating the received sample using the discriminator model; and
    sending an output of the discriminator model toward the second device, wherein the output indicates whether the discriminator model determined the spoofed sample was a true sample from the first transmitter or was a fake sample from a transmitter that is not the first transmitter.

3. The method of claim 2, wherein training comprises:
    in response to the output of the discriminator model indicating the received spoofed sample was a true sample from the transmitter of the first device, updating one or more parameters in the discriminator model.

4. The method of claim 1, wherein the training further comprises:
    coordinating by the first device with the second device to end the training based on a one or more calculated loss functions, the calculated loss functions indicating at least a distance between distributions of samples from the first transmitter and from the spoofed samples.

5. The method of claim 1, wherein the method further comprises performing the training and distributing periodically within a period of time.

6. The method of claim 1, wherein:
the method further comprises performing the training for different temperatures to create different trained discriminator models; and
the distributing further comprises distributing the different trained discriminator models and the corresponding different temperatures to the other device for use by the other device to discriminate samples received by the other device using the different trained discriminator models at corresponding temperatures in order to perform authentication of the transmitter in the first device.

7. A method, comprising:
training, using a generative adversarial network comprising a first device and a second device, a generator model in the second device, the training performed at least by collaborating by the second device with the first device to train the generator model in the second device to produce more accurate spoofed samples transmitted by the second device and toward the first device during the training, and to train a discriminator model in the first device to discriminate between samples from its transmitter and spoofed samples received from the generator model during the training; and
receiving at the second device a trained discriminator model from the first device for use by the second device to discriminate signals from transmitters in order to perform authentication of the transmitter in the first device,
wherein the trained discriminator model from the first device has been trained, using the generative adversarial network additionally comprising a third device, to discriminate samples from the transmitter in the first device from samples from other transmitters, and the training was performed at least by collaborating by the first device with the third device to train the discriminator model in the first device to discriminate between samples from its transmitter and spoofed samples received from a generator model in the third device and to train the generator model in the third device to produce more accurate spoofed samples received by the first device during the training.

8. The method of claim 7, wherein training comprises:
sending a spoofed sample from the second device toward the first device;
receiving, at the second device and from the first device, an output of the discriminator model in the first device, wherein the output indicates whether the discriminator model determined the spoofed sample was a true sample from the first transmitter or was a fake sample from a transmitter that is not the first transmitter; and
in response to an output of the discriminator model indicating the received spoofed sample was a fake sample from a transmitter that is not the first transmitter, updating by the second device one or more parameters in the generator model.

9. The method of claim 7, further comprising discriminating by the second device between samples received at the second device using the trained discriminator model in order to perform authentication of the transmitter of the first device.

10. The method of claim 9, wherein the discriminating further comprises one of:

authenticating by the second device a selected sample received at the second device using the trained discriminator model in response to the discriminating indicating the selected sample is from the transmitter of the first device; or
not authenticating by the second device the selected sample in response to the discriminating indicating the selected sample is not from the transmitter of the first device.

11. The method of claim 7, wherein the training further comprises:
coordinating by the second device with the first device to end the training based on a one or more calculated loss functions, the calculated loss functions indicating at least a distance between distributions of samples from the first transmitter and from the spoofed samples.

12. The method of claim 7, wherein the method further comprises performing the training and receiving periodically over a period of time.

13. The method of claim 7, wherein:
the method further comprises performing the training for different temperatures to create different trained discriminator models; and
the receiving further comprises receiving at the second device the different trained discriminator models and corresponding different temperatures from the first device for use by the second device to discriminate signals from transmitters in order to perform authentication of the transmitter in the first device at different temperatures using corresponding different trained discriminator models.

14. An apparatus comprising:
one or more processors; and
one or more memories including computer program code, wherein the one or more processors, in response to retrieval and execution of the computer program code, cause the apparatus to perform at least the following:
training, using a generative adversarial network comprising a first device and a second device, a discriminator model in the first device to discriminate samples from a transmitter in the first device from samples from other transmitters, the training performed at least by collaborating by the first device with the second device to train the discriminator model to discriminate between samples from its transmitter and spoofed samples received from a generator model in the second device and to train the generator model in the second device to produce more accurate spoofed samples received by the first device during the training, wherein the training results in a trained discriminator model; and
distributing the trained discriminator model from the first device to another device for use by the other device to discriminate samples received by the other device in order to perform authentication of the transmitter in the first device,
wherein training comprises training, using the generative adversarial network additionally comprising a third device, the discriminator model in the first device to discriminate samples from the transmitter in the first device from samples from other transmitters, the training performed at least by collaborating by the first device with the third device to train the discriminator model to discriminate between samples from its transmitter and spoofed samples received from a generator model in the third device and to train the generator model in the third device to produce more accurate spoofed samples received by the first device during the training.

15. The apparatus of claim 14, wherein training comprises:
   receiving at the first device a spoofed sample from the second device;
   discriminating the received sample using the discriminator model; and
   sending an output of the discriminator model toward the second device, wherein the output indicates whether the discriminator model determined the spoofed sample was a true sample from the first transmitter or was a fake sample from a transmitter that is not the first transmitter.

16. The apparatus of claim 15, wherein training comprises:
   in response to the output of the discriminator model indicating the received spoofed sample was a true sample from the transmitter of the first device, updating one or more parameters in the discriminator model.

17. The apparatus of claim 14, wherein the training further comprises:
   coordinating by the first device with the second device to end the training based on a one or more calculated loss functions, the calculated loss functions indicating at least a distance between distributions of samples from the first transmitter and from the spoofed samples.

18. The apparatus of claim 14, wherein the one or more processors, in response to retrieval and execution of the computer program code, cause the apparatus to perform at least the following: performing the training and distributing periodically within a period of time.

19. The apparatus of claim 14, wherein:
   the one or more processors, in response to retrieval and execution of the computer program code, cause the apparatus to perform at least the following: performing the training for different temperatures to create different trained discriminator models; and
   the distributing further comprises distributing the different trained discriminator models and the corresponding different temperatures to the other device for use by the other device to discriminate samples received by the other device using the different trained discriminator models at corresponding temperatures in order to perform authentication of the transmitter in the first device.

* * * * *